United States Patent
Deng

(10) Patent No.: US 10,250,060 B2
(45) Date of Patent: Apr. 2, 2019

(54) ADAPTIVE CHARGE CONTROL CIRCUIT AND CONTROL METHOD FOR SWITCHING CHARGER

(71) Applicant: Silergy Semiconductor Technology (Hangzhou) LTD, Hangzhou, ZheJiang Province (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 220 days.

(21) Appl. No.: 15/340,064

(22) Filed: Nov. 1, 2016

(65) Prior Publication Data

US 2017/0149264 A1    May 25, 2017

(30) Foreign Application Priority Data

Nov. 20, 2015 (CN) .......................... 2015 1 0811192

(51) Int. Cl.
| | | |
|---|---|---|
| *H01M 10/44* | (2006.01) | |
| *H01M 10/46* | (2006.01) | |
| *H02J 7/00* | (2006.01) | |

(52) U.S. Cl.
CPC ............ *H02J 7/0068* (2013.01); *H02J 7/007* (2013.01); *H02J 7/0073* (2013.01); *H02J 7/0077* (2013.01); *H02J 7/0052* (2013.01); *H02J 2007/0059* (2013.01)

(58) Field of Classification Search
CPC ........ H02J 7/0052; H02J 7/007; H02J 7/0013; H02J 7/0068

USPC ........ 320/128, 134, 136, 137, 152, 155, 162
See application file for complete search history.

(56) References Cited

U.S. PATENT DOCUMENTS

| | | | | |
|---|---|---|---|---|
| RE42,114 E | * | 2/2011 | Matsuda | H02J 9/061 |
| | | | | 320/128 |
| 7,990,106 B2 | * | 8/2011 | Hussain | H02J 7/06 |
| | | | | 320/128 |
| 8,450,979 B2 | | 5/2013 | Kerr et al. | |
| 2008/0231233 A1 | | 9/2008 | Thornton | |
| 2014/0152239 A1 | | 6/2014 | Yao et al. | |
| 2014/0203763 A1 | | 7/2014 | Zhao et al. | |
| 2016/0233713 A1 | | 8/2016 | Cheng | |

FOREIGN PATENT DOCUMENTS

| | | |
|---|---|---|
| CN | 103378616 A | 10/2013 |
| CN | 103825329 A | 5/2014 |
| CN | 103856043 A | 6/2014 |

* cited by examiner

*Primary Examiner* — Edward Tso
(74) *Attorney, Agent, or Firm* — Michael C. Stephens, Jr.

(57) ABSTRACT

An adaptive charge control circuit configured for a switching charger can include: an input voltage control circuit configured to receive an input voltage signal of the switching charger and an input voltage reference signal, and to generate a first error signal; an input current control circuit configured to receive an input current signal of the switching charger and an input current reference signal, and to generate a second error signal; a charging current control circuit configured to receive a charging current signal of the switching charger and a charging current reference signal, and to generate a third error signal; and a charging voltage control circuit configured to receive a charging voltage signal of the switching charger and a charging voltage reference signal, and to generate a fourth error signal.

12 Claims, 5 Drawing Sheets

ADAPTIVE CHARGE CONTROL CIRCUIT AND CONTROL METHOD FOR SWITCHING CHARGER

RELATED APPLICATIONS

This application claims the benefit of Chinese Patent Application No. 201510811192.9, filed on Nov. 20, 2015, which is incorporated herein by reference in its entirety.

FIELD OF THE INVENTION

The present disclosure generally relates to the field of switching power supplies, and more particularly to adaptive charge control circuits and methods for a switching charger.

BACKGROUND

Switching chargers have widely been used in various products, such as smart phones, tablet computers, etc., due to the ability of quickly charging lithium batteries. However, the charging time is of increasing concern as the capacity of a lithium battery increases. Typically, a switching charger can reduce the charging time by increasing a charging current. However, in some cases, the charging power may be limited by an input power supply, such that switching charger utilizes the input power supply to the maximum extent. This can reduce the charging time, as well as protect the input power supply from being damaged because of overload.

DETAILED DESCRIPTION

Figure 1:
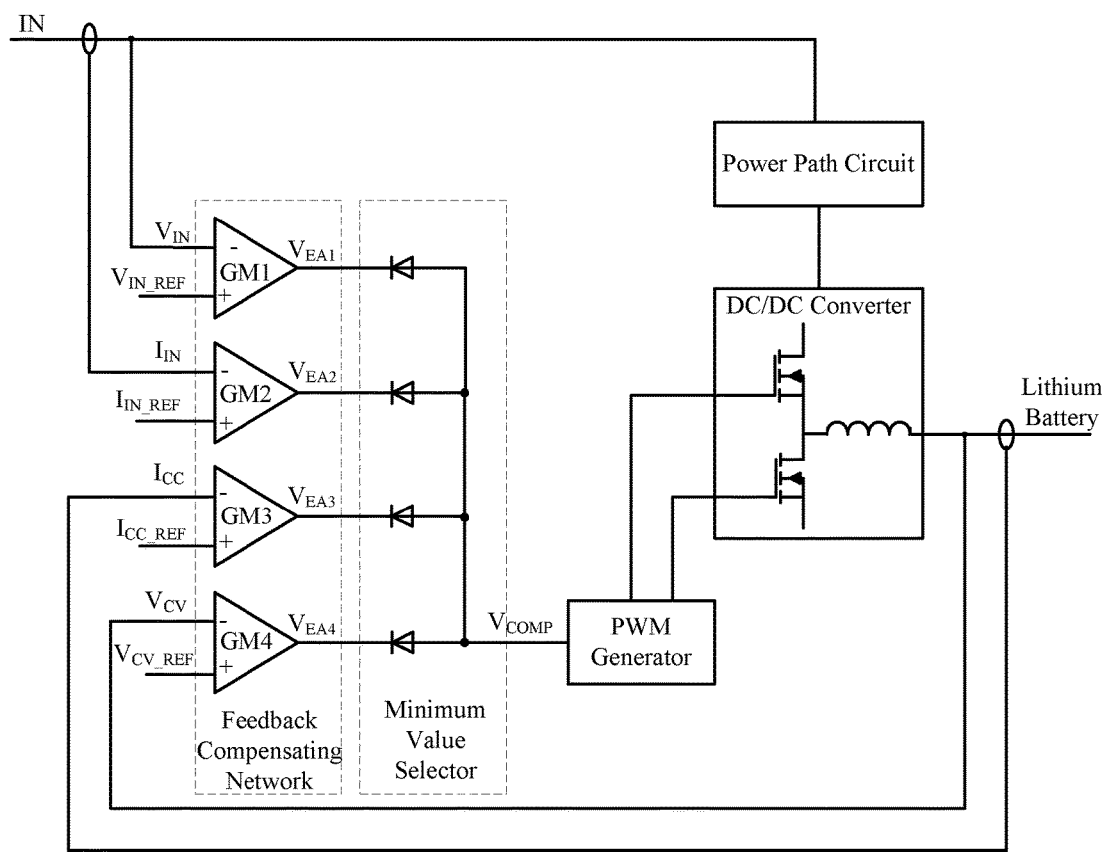
FIG. 1 is a schematic block diagram of an example feedback compensating network of a switching charger.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

One approach for reducing charging time can include determining the type of an input power supply by a control unit, adding an input current control circuit, and regulating an input current based on the type of the input power supply. For example, if the input power supply is detected as a universal serial bus standard downstream port (USB SDP), the input current may be limited to be 100 mA, and if the input power supply is detected as a USB charging downstream port (USB CDP), the input current may be limited to be 1.5 A. In another example, employing a closed loop or a hysteresis loop in the switching charger can be used to limit an input voltage when the current capability of an input power supply is not known. For example, an input current limit value of a non-standard adapter may not be detected or the system may not have detection ability, such that an output voltage may be less than a predetermined value when the load is too large.

In one embodiment, an adaptive charge control circuit configured for a switching charger can include: (i) an input voltage control circuit configured to receive an input voltage signal of the switching charger and an input voltage reference signal, and to generate a first error signal; (ii) an input current control circuit configured to receive an input current signal of the switching charger and an input current reference signal, and to generate a second error signal; (iii) a charging current control circuit configured to receive a charging current signal of the switching charger and a charging current reference signal, and to generate a third error signal; (iv) a charging voltage control circuit configured to receive a charging voltage signal of the switching charger and a charging voltage reference signal, and to generate a fourth error signal; (v) a minimum value selector configured to select a minimum one of the first, second, third, and fourth error signals to control switching operations of a power switch in the switching charger; and (vi) a reference current regulating circuit configured to regulate, based on a comparison of the first error signal against the second, third, and fourth error signals, an input current reference signal of the input current control circuit until the first error signal is at least as high as any of the second, third, and fourth error signals.

Referring now to FIG. 1, shown is a schematic block diagram of an example feedback compensating network of a switching charger. This particular example can include an input voltage control circuit implemented by transconductance amplifier GM1, an input current control circuit implemented by transconductance amplifier GM2, a charging current control circuit implemented by transconductance amplifier GM3, and a charging voltage control circuit implemented by transconductance amplifier GM4. For such a circuit, reference $I_{IN\_REF}$ of the input current control circuit can be set to be the maximum value of the switching charger, such that the input voltage control circuit is used to protect the input power supply when the input current control circuit is off.

However, because of the different output properties of the input power supplies, the output loads of different input power supplies may be different even though they might have the same limiting voltage. For example, some input power supplies may not be able to optimize the charging ability when the limiting voltage is relatively large. Also, some input power supplies may operate at an overload state for a relatively long time period when the limiting voltage is relatively low, and as such the input device may not be well protected.

Figure 2:
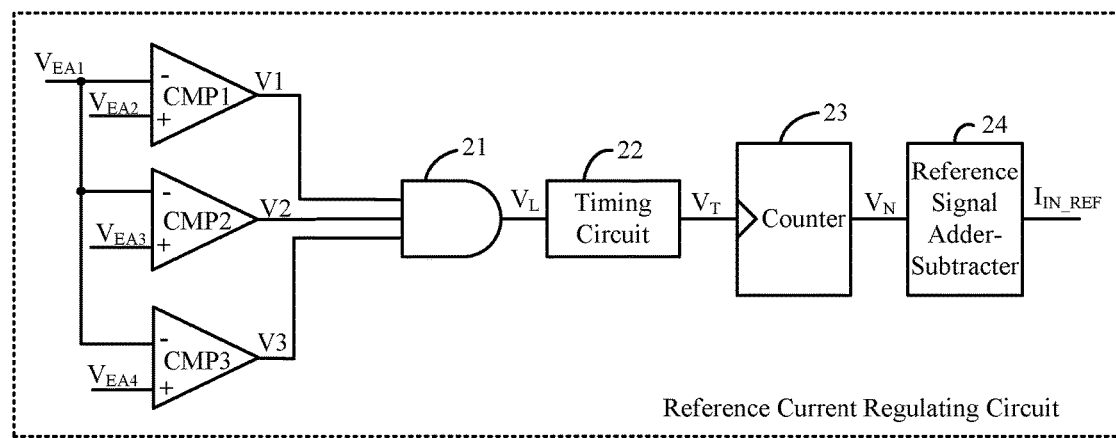
FIG. 2 is a schematic block diagram of a first example reference current regulating circuit, in accordance with embodiments of the present invention.

Referring now to FIG. 2, shown is a schematic block diagram of a first example reference current regulating circuit, in accordance with embodiments of the present invention. An example control circuit of a switching charger in particular embodiments can include a feedback compensating network shown in FIG. 1, as well as a reference current regulating as circuit shown in FIG. 2. As shown in FIG. 1, the switching charger can receive external input power IN, and may provide an appropriate output voltage to charge a lithium battery through a power path circuit and a DC/DC converter. For example, the feedback compensating network of the switching charger can include an input voltage control circuit implemented by transconductance amplifier GM1, an input current control circuit implemented by transconductance amplifier GM2, a charging current control circuit implemented by transconductance amplifier GM3 and a charging voltage control circuit implemented by transconductance amplifier GM4.

Transconductance amplifier GM1 can receive input voltage signal $V_{IN}$ of the switching charger and input voltage reference signal $V_{IN\_REF}$, and may generate error signal $V_{EA1}$. Transconductance amplifier GM2 can receive input current signal $I_{IN}$ of the switching charger and input current reference signal $I_{N\_REF}$, and may generate error signal $V_{EA2}$. Transconductance amplifier GM3 may receive charging current signal $I_{CC}$ of the switching charger and charging current reference signal $I_{CC\_REF}$, and may generate error signal $V_{EA3}$. Transconductance amplifier GM4 can receive charging voltage signal $V_{CV}$ of the switching charger and charging voltage reference signal $V_{CV\_REF}$, and may generate error signal $V_{EA4}$.

The control circuit can select the minimum one of error signals $V_{EA1}$, $V_{EA2}$, $V_{EA3}$ and $V_{EA4}$ by a minimum value selector as a feedback compensation signal $V_{COMP}$ for a pulse-width modulator (PWM) generator. For example, the PWM generator can generate a switching control signal in order to control the switching operations of a power switch (e.g., power transistor) in the DC/DC converter. As shown in FIG. 1, the minimum value selector in this example can include four diodes with their four cathodes respectively coupled to output terminals of four transconductance amplifiers, and their four anodes coupled together to output feedback compensation signal $V_{COMP}$.

The reference current regulating circuit can receive error signals $V_{EA1}$, $V_{EA2}$, $V_{EA3}$, and $V_{EA4}$, and may generate input current reference signal $I_{IN\_REF}$, which may be provided to the input terminal of transconductance amplifier GM2. FIG. 2 shows one example implementation of the reference current reference signal, can include a comparison circuit, AND-gate 21, timing circuit 22, counter 23, and reference signal adder-subtractor 24. The comparison circuit can include comparators CMP1, CMP2, and CMP3 with their negative input terminals receiving error signal $V_{EA1}$, and their positive input terminals respectively receiving error signals $V_{EA2}$, $V_{EA3}$, and $V_{EA4}$, and their output terminals respectively generating comparison signals V1, V2, and V3. AND-gate 21 can receive comparison signals V1, V2, and V3, and may generate logic signal $V_L$. Logic signal $V_L$ may be active (e.g., logic high) when comparison signals V1, V2, and V3 are all active (e.g., logic high). Timing circuit 22 can receive logic signal $V_L$, and can time the active period of the logic signal. For example, when logic signal $V_L$ remains active for a predetermined time (e.g., $T_{detection}$), a timing signal generated by timing circuit 22 can be activated.

Counter 23 can receive timing signal $V_T$, and counter 23 can increase the current recorded number N by one when the timing signal is active. Counter 23 can also compare the incremented number against predetermined maximum number Nmax, and times signal $V_N$ of the counter can be activated if the incremented number is less than predetermined maximum number Nmax. Reference signal adder-subtractor 24 can receive times signal $V_N$ and a predetermined input current reference signal, and may reduce the predetermined input current reference signal when the times signal is active, in order to generate regulated input current reference signal $I_{IN\_REF}$. For example, the predetermined input current reference signal can be the maximum value of the input current reference signal.

In one embodiment, a method of adaptive charge control for a switching charger, can include: (i) receiving an input voltage signal of the switching charger and an input voltage reference signal, and generating a first error signal; (ii) receiving an input current signal of the switching charger and an input current reference signal, and generating a second error signal; (iii) receiving a charging current signal of the switching charger and a charging current reference signal, and generating a third error signal; (iv) receiving a charging voltage signal of the switching charger and a charging voltage reference signal, and generating a fourth error signal; (v) selecting a minimum one of the first, second, third, and fourth error signals, to control switching operations of a power switch in the switching charger; and (vi) regulating, based on a comparison of the first error signal against the second, third, and fourth error signals, an input current reference signal of the input current control circuit until the first error signal is at least as high as any of the second, third, and fourth error signals.

Figure 3:
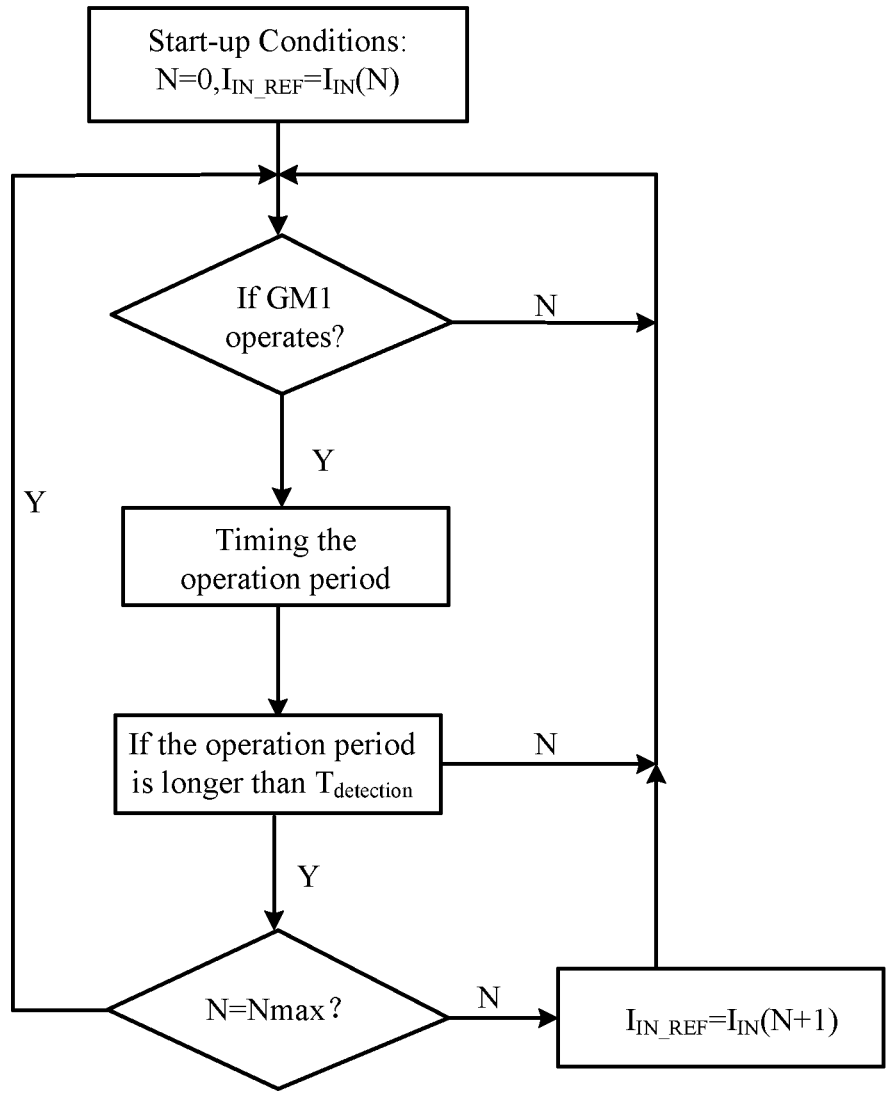
FIG. 3 is a flow diagram of example operation of the reference current regulating circuit of FIG. 2, in accordance with embodiments of the present invention.

Referring now to FIG. 3, shown is a flow diagram of example operation of the reference current regulating circuit of FIG. 2, in accordance with embodiments of the present invention. For example, during normal operation of the circuit, the input voltage control circuit may be in the off state, and the number recorded by the counter is N=0, $I_{IN\_REF}=I_{IN}(0)$, where $I_{IN}(0)$ is the predetermined input current reference signal. When the circuit operates abnormally, if the input current of the switching charger increases, the output voltage of the input power supply may decrease, error signal $V_{EA1}$ can be less than error signals $V_{EA2}$, $V_{EA3}$, and $V_{EA4}$, and the input voltage control circuit (e.g., GM1) can be enabled. AND-gate 21 may output a high level logic signal, and timing circuit 22 can begin timing the operation time of GM1 when the logic signal is in the active state. Once the operation time is greater than predetermined time $T_{detection}$ (e.g., 100 ms), the counter can increase the current number N by one, and compare incremented number N against maximum number Nmax. If N<Nmax, the reference signal adder-subtractor (e.g., 24) can decrease the current input current reference signal $I_{IN}(0)$ by a predetermined step, and may provide regulated input current reference signal $I_{IN}(1)$ to the positive input terminal of transconductance amplifier GM2 of the input current control circuit.

The input current may decrease along with the input current reference signal $I_{IN\_REF}$. While the input voltage increases, and when error signal $V_{EA1}$ is greater than error signal $V_{EA2}$, the input voltage control circuit may be disabled, and the input current control circuit can be enabled. In such a process, the reference current regulating circuit may automatically recover to the start-up state when GM1 is not enabled, and the operation time can be less than the predetermined time or the number of counts for the counter to reach Nmax. The input voltage can be kept in a safe voltage range and the switching charger can operate normally by decreasing the input current of the switching charger to be less than the current reference signal. Also, the charging current of the switching charger can be ensured to be large enough such that the charging safety and speed can be be optimized by reducing the input current reference signal step by step.

Figure 4:
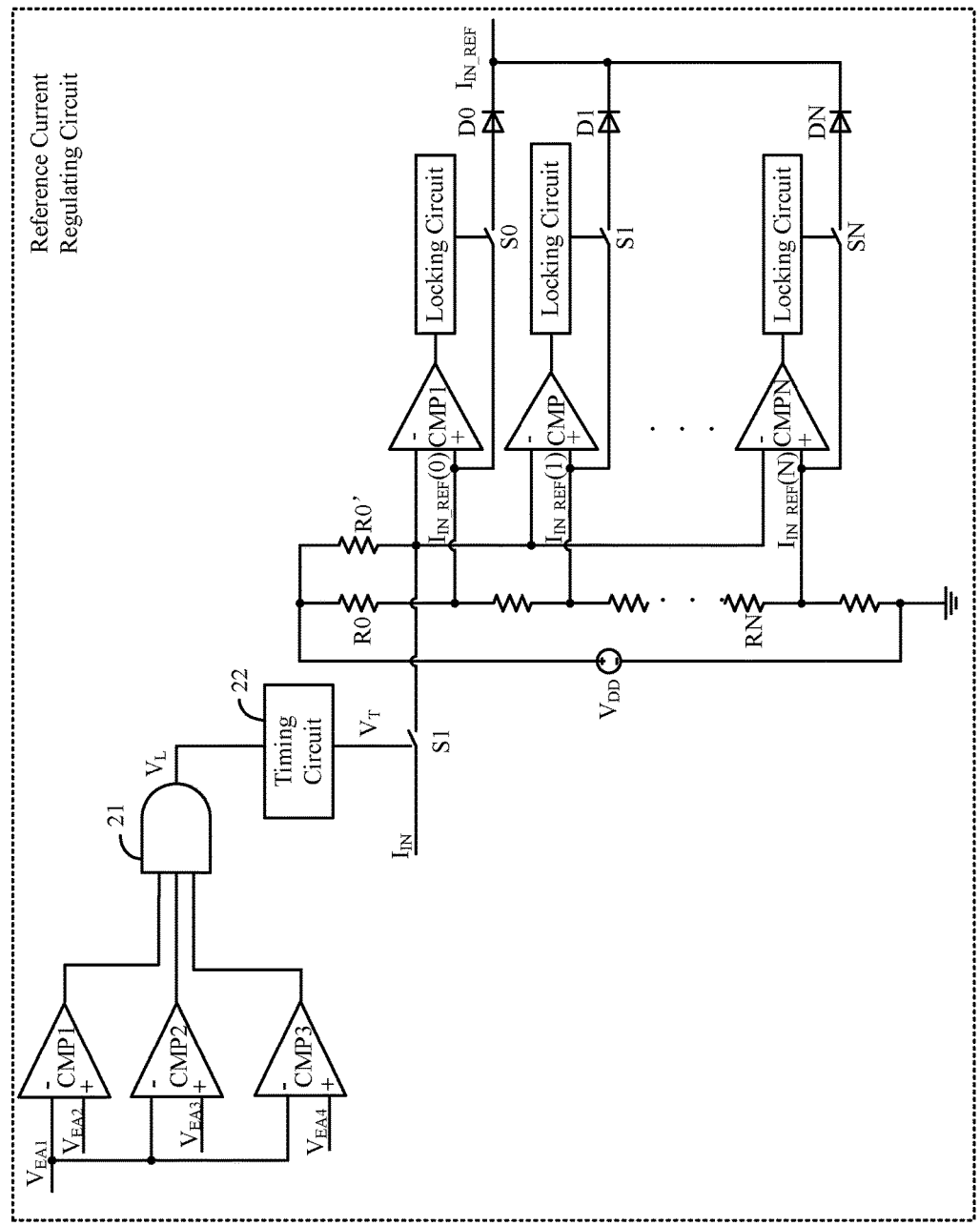
FIG. 4 is a schematic block diagram of a second example reference current regulating circuit, in accordance with embodiments of the present invention.

Referring now to FIG. 4, shown is a schematic block diagram of a second example reference current regulating circuit, in accordance with embodiments of the present invention. This particular reference current regulating circuit can include a comparison circuit, AND-gate 21, timing circuit 22, and an input current reference signal regulating circuit. In some cases, the comparison circuit, the AND-gate, and the timing circuit may be the same as in the example discussed above. In FIG. 4, the input current reference signal regulating circuit can include voltage source VDD, N series-coupled resistors (e.g., resistors R0-RN), a comparison circuit, and a selection circuit. The voltage source can be coupled to N resistors in parallel, and common nodes of every two adjacent resistors may provide N input current reference signals. The N input current reference signals may be decreased step by step, such as $I_{N\_REF}(0)$ to $I_{IN\_REF}(N)$, and the N resistors may each have the same resistance.

The comparison circuit can include N sub-comparison circuits (e.g., comparator CMP1-CMPN). The first input terminals of the N comparators can receive input current signal $I_{IN}$, and the second input terminals can receive N input current reference signals $I_{IN\_REF}(0)$ to $I_{IN\_REF}(N)$ respectively. The output terminals of the N comparators may generate N comparison signals. The selection circuit can include N locking circuits, N switching circuits, and N diodes. For example, the N locking circuits can correspond to the N input current reference signals. The first terminals of the N switching circuits can receive N input current reference signals respectively, the control terminals can receive N comparison signals respectively, and the second terminals can be coupled together as the output terminal of the input current reference signal control circuit.

Figure 5:
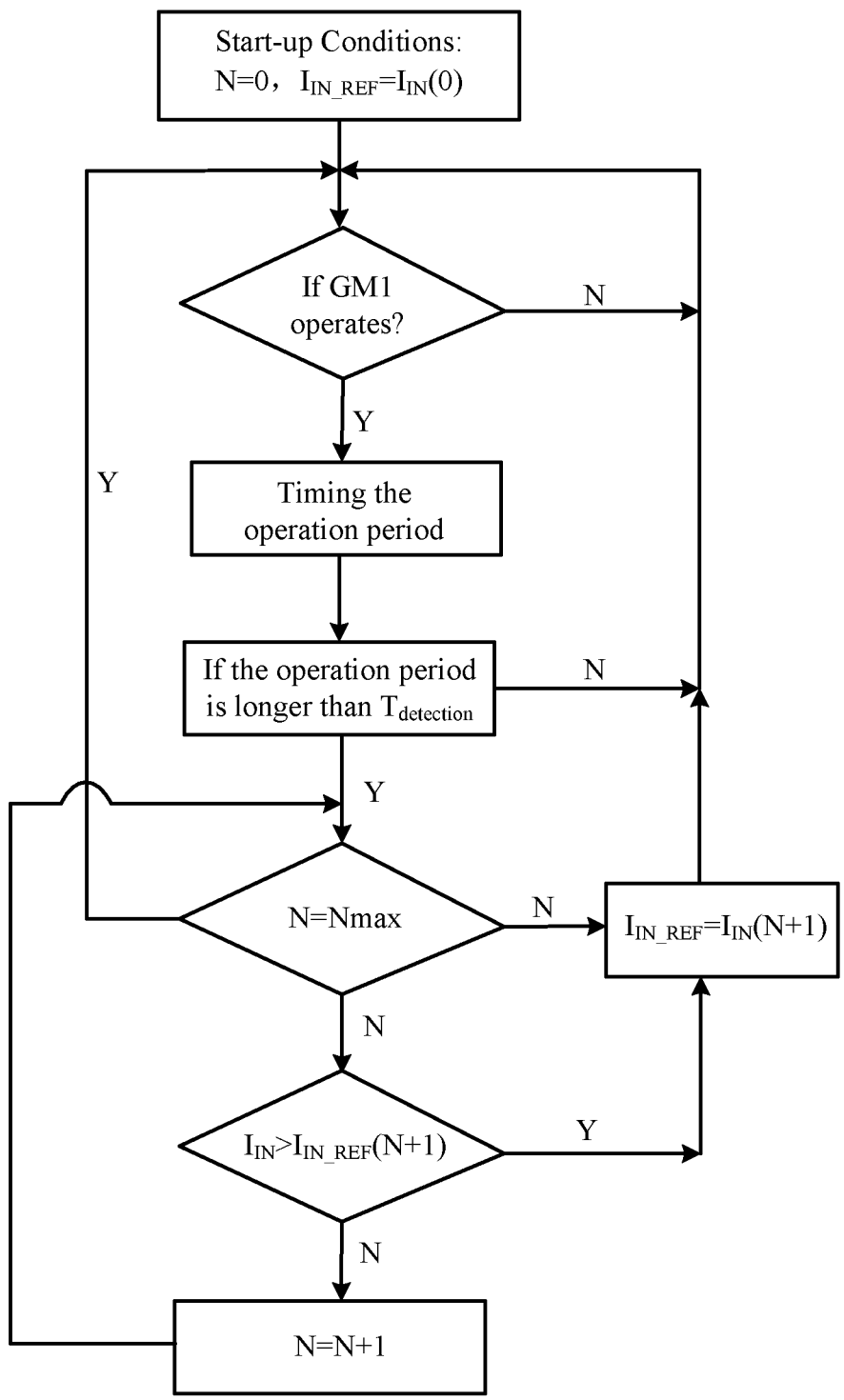
FIG. 5 is a flow diagram of example operation of the reference current regulating circuit of FIG. 4, in accordance with embodiments of the present invention.

Referring now to FIG. 5, shown is a flow diagram of example operation of the reference current regulating circuit of FIG. 4, in accordance with embodiments of the present invention. In this example, when the reference current regulating circuit is not enabled, the number recorded by the counter can be N=0, $I_{IN\_REF}=I_{IN}(0)$, where $I_{IN}(0)$ is the predetermined input current reference signal. When the input current of the switching charger increases, the output voltage of the input power supply can decrease, and error signal $V_{EA1}$ may be less than error signals $V_{EA2}$, $V_{EA3}$, and $V_{EA4}$. The input voltage control circuit (e.g., GM1) can be enabled (e.g., operational), and AND-gate 21 can output a high level logic signal. Timing circuit 22 can time the operation period of GM1 when the logic signal is in the active state. When the operation period is longer than predetermined time $T_{detection}$, timing signal $V_T$ may be activated (e.g., go high). Thus, switch S1 can be turned on such that sub-comparison circuit CMP1 is enabled/operational. $I_{IN\_REF}$ can be reduced to $I_{IN}(1)$, and the reduced input current reference signal may be provided to the input current control circuit, such that input current $I_{IN}$ is decreased and the input voltage of the switching charger is increased.

When timing signal $V_T$ is high, and number N is less than maximum number Nmax, input current $I_{IN}$ can be compared against $I_{IN\_REF}(N+1)$ in sequence. If $I_{IN}$ is greater than $I_{IN\_REF}(N+1)$, $I_{IN\_REF}=I_{IN\_REF}(N+1)$, or else, if $I_{IN}$ is less than $I_{IN\_REF}(N+1)$, the process may proceed to the next comparison until the number N reaches maximum number Nmax, whereby the comparison ends. In the above-described process, the reference current regulating circuit may automatically recover to the start-up state when GM1 is not operating, and the operation time may be less than the predetermined time or the number of the counter reaches Nmax.

In an example control method for a switching charger, the switching charger can receive an external input power supply, and may generate an appropriate current to charge a battery after power conversion. The example method can include receiving an input voltage signal (e.g., $V_{IN}$) of the switching charger and an input voltage reference signal (e.g., $V_{IN\_REF}$), and generating a first error signal (e.g., $V_{EA1}$). The example method can also include receiving an input current signal (e.g., $I_{IN}$) of the switching charger and an input current reference signal (e.g., $I_{IN\_REF}$), and generating a second error signal (e.g., $V_{EA2}$).

The example method can also include receiving a charging current signal (e.g., $I_{CC}$) of the switching charger and a charging current reference signal (e.g., $I_{CC\_REF}$), and generating a third error signal (e.g., $V_{EA3}$). The example method can also include receiving a charging voltage signal (e.g., $V_{CV}$) of the switching charger and a charging voltage reference signal (e.g., $V_{CV\_REF}$), and generating a fourth error signal (e.g., $V_{EA4}$). The example method can also include selecting the minimum one of the first, second, third, and fourth error signals, in order to control the switching operations of the power switch in the switching charger.

The first error signal can be compared against the second, third, and fourth error signals, and the input current reference signal can be regulated when the first error signal is detected to be less than the second, third, and fourth error signals, until the first error signal is no less than any one of the second, third, and fourth error signals. For example, the input current reference signal can be decreased by steps until the first error signal is no less than any one of the second, third, and fourth error signals.

In the above described adaptive charge control circuits and methods for a switching charger, the reference current regulating circuit can determine if the input current of the switching charger is too large. If yes, the input current reference signal may be reduced by step(s), so as to reduce the input current of the switching charger, and to maintain the output voltage of the input power supply in the safety range. In addition, the charging current of the switching charger may not be reduced too low, and can remain at a relatively large value in order to realize relatively fast charging.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An adaptive charge control circuit configured for a switching charger, the control circuit comprising:
   a) an input voltage control circuit configured to receive an input voltage signal of said switching charger and an input voltage reference signal, and to generate a first error signal;
   b) an input current control circuit configured to receive an input current signal of said switching charger and an input current reference signal, and to generate a second error signal;

c) a charging current control circuit configured to receive a charging current signal of said switching charger and a charging current reference signal, and to generate a third error signal;

d) a charging voltage control circuit configured to receive a charging voltage signal of said switching charger and a charging voltage reference signal, and to generate a fourth error signal;

e) a minimum value selector configured to select a minimum one of said first, second, third, and fourth error signals to control switching operations of a power switch in said switching charger; and f) a reference current regulating circuit configured to regulate, based on a comparison of said first error signal against said second, third, and fourth error signals, said input current reference signal of said input current control circuit until said first error signal is at least as high as any of said second, third, and fourth error signals, wherein said reference current regulating circuit gradually reduces said input current reference signal when said input voltage control circuit operates until said input voltage control circuit stops operating.

2. The control circuit of claim 1, wherein said reference current regulating circuit comprises:

a) a comparison circuit configured to compare said first error signal against said second, third, and fourth error signals, and to generate first, second, and third comparison signals therefrom;

b) an AND-gate configured to activate a logic signal when said first, second, and third comparisons signal are all active;

c) a timing circuit configured to time the active period of said logic signal, and to activate a timing signal when said active period of said logic signal equals at least a predetermined time period; and d) an input current reference signal control circuit configured to reduce a predetermined input current reference signal when said timing signal is active, and to generate a regulated input current reference signal for a next switching cycle.

3. The control circuit of claim 2, wherein said input current reference signal control circuit comprises:

a) a counter configured to receive said timing signal, to increase a current recorded number by one when said timing signal is active, and to activate a times signal when an incremented number is less than a predetermined maximum number; and b) a reference signal adder-subtractor configured to reduce a predetermined input current reference signal when said times signal is active, and to generate a regulated input current reference signal.

4. The control circuit of claim 2, wherein said input current reference signal control circuit comprises:

a) a comparison circuit having N sub-comparison circuits, wherein first input terminals of said N sub-comparison circuits are configured to receive said input current signal, second input terminals are configured to receive N input current reference signals respectively, and output terminals are configured to provide N comparison signals, wherein N is a non-negative integer; and b) a selection circuit having N locking circuits, N switching circuits, and N diodes, where said N locking circuits are configured to receive said N comparison signals, first terminals of said N switching circuits are configured to receive said N input current reference signals respectively, control terminals are configured to receive said N comparison signals, and second terminals of said N switching circuits are coupled together as an output terminal of said input current reference signal control circuit.

5. The control circuit of claim 4, wherein, a circuit for generating said N input current reference signals comprises a voltage source is coupled with N resistors in parallel, wherein common nodes of every two adjacent resistors are configured to provide said N input current reference signals.

6. A method of adaptive charge control for a switching charger, the method comprising:

a) receiving, by an input voltage control circuit, an input voltage signal of said switching charger and an input voltage reference signal, and generating a first error signal;

b) receiving, by an input current control circuit, an input current signal of said switching charger and an input current reference signal, and generating a second error signal;

c) receiving, by a charging current control circuit, a charging current signal of said switching charger and a charging current reference signal, and generating a third error signal;

d) receiving, by a charging voltage control circuit, a charging voltage signal of said switching charger and a charging voltage reference signal, and generating a fourth error signal;

e) selecting a minimum one of said first, second, third, and fourth error signals, to control switching operations of a power switch in said switching charger; and f) regulating, by a reference current regulating circuit and based on a comparison of said first error signal against said second, third, and fourth error signals, said input current reference signal of said input current control circuit until said first error signal is at least as high as any of said second, third, and fourth error signals, wherein said reference current regulating circuit gradually reduces said input current reference signal when said input voltage control circuit operates until said input voltage control circuit stops operating.

7. The method of claim 6, further comprising decreasing said input current reference signal by steps until said first error signal is at least as high as any one of said second, third, and fourth error signals.

8. The method of claim 7, wherein said decreasing said input current reference signal comprises:

a) activating a logic signal when said first error signal is detected to be less than said second, third, and fourth error signals;

b) timing an active period of said logic signal and activating a timing signal when said active period of said logic signal reaches a predetermined time period;

c) increasing a current recorded number by one and comparing and incremented number against a predetermined maximum number via a counter when said timing signal is active, and activating a times signal when said incremented number is less than said predetermined maximum number; and d) reducing a predetermined input current reference signal when said times signal is active, and generating a regulated input current reference signal.

9. The method of claim 7, wherein said decreasing said input current reference signal comprises:

a) activating a logic signal when said first error signal is detected to be less than said second, third, and fourth error signals;

b) timing an active period of said logic signal and activating a timing signal when said active period of said logic signal reaches a predetermined time period;

c) comparing said input current signal against N predetermined input current reference signals and generating N comparison signals when said timing signal is active, wherein N is a non-negative integer; and d) selecting a minimum one of said N comparison signals as said input current reference signal.

10. A method of adaptive charge control for a switching charger, the method comprising:

a) determining whether an overloaded condition occurs;

b) controlling, by an input voltage control circuit, an input voltage of said switching charger when said overloaded condition occurs;

c) determining whether a length of an operation time of said input voltage control circuit is greater than a predetermined time; and d) changing an input current reference signal of an input current control circuit to limit an input current of said switching charger to decrease said input voltage until said overloaded condition ends when said length of said operation time of said input voltage control circuit is greater than said predetermined time.

11. The method of claim 10, further comprising gradually decreasing said input current reference signal to limit an input current of said switching charger to decrease said input voltage when said length of said operation time of said input voltage control circuit is greater than said predetermined time.

12. The method of claim 10, further comprising regulating said input current reference signal in accordance with a current value of said input current to regulate said input current to decrease said input voltage when said length of said operation time of said input voltage control circuit is greater than said predetermined time.

* * * * *